United States Patent Office
2,959,491
Patented Nov. 8, 1960

2,959,491
PLASTICIZED CELLULOSE ETHERS
Joseph R. Darby, Webster Groves, Mo., assignor to Monsanto Chemical Company, St. Louis, Mo., a corporation of Delaware
No Drawing. Filed June 23, 1958, Ser. No. 744,009
13 Claims. (Cl. 106—191)

This invention relates to new and useful cellulose ether compositions, more particularly it relates to a novel method of plasticizing cellulose ethers as well as the resulting plasticized cellulose ether products.

It has been discovered that clear, strong, tough, extensible, flexible films of cellulose ethers can be readily prepared by combining a cellulose ether with a liquid aromatic hydrocarbon mixture, obtained as the high boiling residue from the alkylation of benzene (or a mononuclear aromatic hydrocarbon of the benzene series) with a branched or straight chain olefin (or mixture of olefins) or a branched or straight chain alkyl halide (or mixture of alkyl halides) containing 9 to 18 carbon atoms. A particularly useful and economical high boiler residue is that obtained when an aromatic hydrocarbon of the benzene series is condensed with an acyclic propylene polymer containing 9 to 18 carbon atoms, and then distilled to remove the benzene, intermediate fraction and the mono-alkylated benzene fraction, leaving behind the high boiling residue. The high boiling residues obtained when a $C_{12}$ to $C_{18}$ acyclic propylene polymer is employed are preferred for the purposes of this invention. The major component of these propylene polymers has the general structure

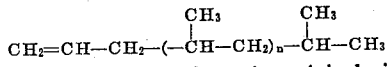

wherein $n$ is an integer of from 1 to 4 inclusive. The propylene polymers upon condensing with an aromatic hydrocarbon, such as benzene or the members of the benzene series, provide a mixture of mono-alkylated products of which the major component may be represented by the following structural formula

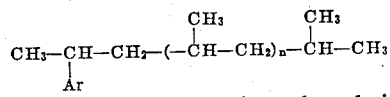

wherein Ar represents an aromatic nucleus derived from a member of the benzene series, such as phenyl, tolyl and xylyl and where $n$ is an integer of from 1 to 4. The preparation of such aryl alkanes is well known and is ordinarily carried out at relatively low temperatures in the presence of an alkylation catalyst.

Many types of catalysts have found use in the alkylation reaction including the better known Friedel-Crafts catalysts, for example, aluminum chloride, aluminum bromide and ferric chloride. Zinc, tin, and titanium chlorides, boron halides, sulfuric acid, hydrofluoric acid, phosphoric acid are also used. Also frequently used are solid absorbent catalysts comprising oxides of the metals of group 3B or 4A of the periodic system in combination with silica oxide. Still other catalysts often used are the metal pyrophosphates.

As illustrative of another useful and economical high boiling residue there may be mentioned the high boiling residue obtained from the reaction product resulting when benzene or an aromatic hydrocarbon of the benzene series is mono-alkylated with the product obtained by substantial mono-chlorination of paraffin base fractions, the said high boiling mixture being the residue left in the still pot after the excess benzene, intermediate fraction and mono-alkylated benzene fraction are removed by distillation. The said paraffin base fractions are obtained from Pennsylvania base oil and are often termed paraffin base kerosenes. In general such kerosene fractions distill between 150° C. and 300° C., but preferably in the range of 190° C. to 250° C. and contain 10 to 16 carbon atoms to the molecule and usually average 12 carbon atoms per molecule.

The high boiling liquid aromatic hydrocarbon materials of this invention consist essentially of mono- and polyalkylated benzenes, alkylated biphenyl and diphenyl alkanes. For the purpose of brevity these high boiling liquid aromatic hydrocarbon materials will be hereinafter referred to as "HBHC."

The cellulose ethers which can be plasticized with HBHC according to this invention include, among others, the commercially available cellulose ethers, methyl cellulose, ethyl cellulose, butyl cellulose, and benzyl cellulose. The present invention is particularly applicable to plasticizing cellulose ethers and especially the cellulose ethers having an alkoxyl content of at least about 40%. The preferred cellulose ethers for the practice of this invention are those ethers having an alkoxyl content of 40% to 50%.

The following examples, in which all "parts" are parts by weight, are intended to illustrate the present invention and are not intended as a limitation thereon.

In the following examples there are described various specific high boiling liquid hydrocarbon mixtures and the process by which they are obtained.

EXAMPLE A

A high boiling liquid aromatic hydrocarbon mixture (HBHC "A") having the following physical properties:

|  | HBHC "A" |
|---|---|
| Refractive index (25° C.) | 1.4917 |
| Specific gravity (25/15.5° C.) | 0.8785 |
| Viscosity: | |
| 100° F. ___cs__ | 71.2 |
| 210° F. ___cs__ | 6.26 |
| Pour point ___° F__ | −15 |
| Flash point ___° F__ | 355 |
| Fire point ___° F__ | 415 |
| Molecular weight (apparent average) | 340 | is obtained from the reaction product resulting from the reaction of a propylene tetramer (B.P. 180–220° C.) with benzene (molar excess) in the presence of anhydrous aluminum chloride and dry hydrogen chloride gas (0.2–0.3 percent by weight of the reactants) at room temperature. The said high boiling residue being the material left in the still pot when the excess benzene, intermediate fraction and $C_{12}$ alkylbenzene are removed by distillation.

EXAMPLE B

A high boiling liquid aromatic hydrocarbon mixture is obtained in the same manner as the mixture of Example A, except that said mixture has the following physical properties:

|  | HBHC "B" |
| --- | --- |
| Refractive index (25° C.) | 1.4917 |
| Specific gravity (25/15.5° C.) | 0.8791 |
| Viscosity: | |
| 100° F. _____cs__ | 93.2 |
| 210° F. _____cs__ | 7.36 |
| Pour point _____° F__ | −15 |
| Flash point _____° F__ | 395 |
| Fire point _____° F__ | 430 |
| Distillation range (at 5 mm. Hg) [1]: | |
| 1st drop _____° C__ | 189 |
| 50% _____° C__ | 219 |
| Molecular weight (apparent average) | 375 |

[1] The distillation data is obtained by placing 100 ml. of the high boiler residue in a flask to which there is attached a condenser. The vapor temperature at the top of a flask is taken at the time the first drop comes out of the condenser. The 50% point represents the vapor temperature at the time 50 ml. of distillate is collected (ASTM, Engler range).

EXAMPLE C

A high boiling liquid aromatic hydrocarbon mixture having the following properties:

|  | HBHC "C" |
| --- | --- |
| Appearance | Dark amber viscous liquid. |
| Refractive index (25° C.) | 1.4893. |
| Specific gravity (25/15.5° C.) | 0.872. |
| Disillation range (5 mm. Hg): | |
| 1st drop | 190° C. |
| 50% point | 243° C. |
| Molecular weight (apparent average) | 335. | is obtained by reacting a commercial propylene tetramer (B.P. 186–206° C.) with benzene in the following manner:

1000 parts by weight of dried benzene and 11 parts by weight of commercial anhydrous aluminum chloride are charged into a closed reaction vessel provided with a stirring device capable of vigorously agitating said mixture. While said mixture is being agitated, a small amount (0.2 to 0.3 percent by weight of the total reactants) of anhydrous hydrogen chloride gas is introduced into the reaction vessel through a steam sparger located below the surface of the benzene until the evolution of hydrogen chloride gas is noted at the top of the reflux condenser. Three parts of active clay (Superfiltrol) are introduced into the reaction vessel while still maintaining vigorous agitation. Thereafter 320 parts by weight of propylene tetramer are slowly introduced over a period of about 20 minutes. The temperature of the reaction mixture is held at from about 30° C. to about 35° C. throughout the process by means of a cooling coil in the reaction vessel. Agitation is continued for about 15 minutes after all the olefin has been introduced. Agitation is terminated and the reaction mixture is allowed to stand for about 30 minutes during which time the catalyst complex settles and is separated from the alkylation mass. The alkylation mass is then washed with an equal volume of water at 25° C. and dried over calcium sulfate. The dried, washed alkylation liquor is then fractionated into four fractions consisting of: (1) excess benzene employed in the reaction, (2) the intermediate, (3) the dodecylbenzene, (4) the residue or high boiling fraction. The cut ranges are as follows: (1) benzene up to a vapor temperature of 115–120° C. at atmospheric pressure, then (2) intermediate up to a vapor temperature of 110–112° C. at 20 mm. mercury pressure, then (3) the dodecylbenzene fraction up to a temperature of 155–157° C. at 2 mm. mercury pressure, and (4) the residue.

EXAMPLE D

A high boiling liquid aromatic hydrocarbon mixture having the following physical properties:

|  | HBHC "D" |
| --- | --- |
| Appearance | Dark amber viscous liquid. |
| Refractive index (25° C.) | 1.4890 |
| Specific gravity (25/15.5° C.) | 0.871. |
| Distillation range (5 mm Hg): | |
| 1st drop | 203° C. |
| 50% | 230° C. |
| Molecular weight (apparent average) | 330. | is obtained by employing the process described in Example C.

EXAMPLE E

A high boiling liquid aromatic hydrocarbon mixture having the following physical properties:

|  | HBHC "E" |
| --- | --- |
| Appearance | Dark amber viscous liquid. |
| Refractive index (25° C.) | 1.4987. |
| Specific gravity (25/15.5° C.) | 0.876. |
| Distillation range (5 mm. Hg): | |
| 1st drop | 190° C. |
| 50% | 222° C. |
| Molecular weight (apparent average) | 400. | is obtained by employing the process of Example C except that a mixture of branched chain olefins ($C_{12}$ to $C_{15}$, B.P. 200–260° C.) containing an average of 13 carbon atoms is used as the alkylating agent and three times the amount of catalyst is employed. After the tridecylbenzene fraction is distilled, there remains behind in the still pot a high boiling liquid aromatic hydrocarbon mixture (HBHC "E"). The apparent average molecular weight of an HBHC produced from a $C_{13}$ propylene polymer mixture varies within the range of 380–450.

EXAMPLES F, G, H, I, J, K

The following high boiling liquid aromatic hydrocarbon (having the indicated physical properties) are obtained by using the process described in Example C, except that the active clay is omitted and the high boiler fraction is recycled at the rate of about 15 parts by weight of high boiler per 100 parts by weight of olefin:

| HBHC | Refractive Index at 25° C. | Specific Gravity, 25/15.5° C. | Distillation Range at 5 mm. Hg | |
| --- | --- | --- | --- | --- |
| | | | 1st drop | 50% |
| "F" | 1.4898 | 0.869 | 191 | 215 |
| "G" | 1.4890 | 0.873 | 195 | 228 |
| "H" | 1.4875 | 0.868 | 185 | 241 |
| "I" | 1.4880 | 0.869 | 205 | 230 |
| "J" | 1.4888 | 0.870 | 210 | 239 |
| "K" | 1.4892 | 0.878 | 214 | 245 |

The apparent average molecular weight of the above materials is within the range of 330–380.

EXAMPLE L

HBHC "L" a high boiling liquid aromatic hydrocarbon mixture is obtained from the reaction mixture resulting from the reaction at room temperature and in the presence of anhydrous hydrofluoric acid, of a commercial propylene pentamer with benzene to form a $C_{15}$ alkylbenzene derivative in which the pentadecyl substituent is principally

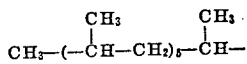

The reaction mixture is dried and then subjected to distillation. The HBHC "L" fraction represents that material left in the still pot after the excess benzene, intermediate fraction and $C_{15}$ alkylbenzene fraction are removed.

EXAMPLE M

The process of Example L is repeated except that boron trifluoride is substituted for the anhydrous hydrofluoric acid, and propylene hexamer is substituted for the propylene pentamer. Analysis indicates that the $C_{18}$ alkylbenzene produced has an octadecyl substituent which is principally

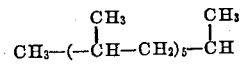

On distilling the excess benzene, intermediate fraction and $C_{18}$ alkylbenzene fraction from the reaction product, a high boiling liquid aromatic hydrocarbon mixture, HBHC "M," is obtained.

EXAMPLE N

The process of Example M is repeated except that a commercial propylene trimer (B.P. 107–144° C.) is substituted for the propylene hexamer of said example. Analysis indicates that the nonyl substituent in the $C_9$ alkylbenzene produced is principally

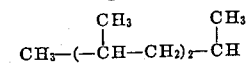

On distilling the excess benzene, intermediate fraction and $C_9$ alkylbenzene from the reaction mixture, a high boiling liquid aromatic hydrocarbon mixture HBHC "N" is obtained.

EXAMPLE O

A high boiling liquid aromatic hydrocarbon mixture HBHC "O" is obtained in the following manner. Kerosene chloride obtained by introducing chlorine into the kerosene fraction until said fraction is substantially two-thirds chlorinated on a molar basis (said kerosene fraction boiling between 190° C. and 250° C. and consisting essentially of paraffinic hydrocarbons averaging 12 carbon atoms per molecule) is condensed with a substantially equimolecular proportion of benzene at room temperature and in the presence of a catalytic amount of aluminum chloride. On distilling the excess benzene, intermediate fraction and $C_{12}$ alkylbenzene from the reaction mixture there remains behind in the still pot a high boiling residue, hereinafter referred to as HBHC "O."

The compositions illustrating this invention are prepared by dissolving the cellulose ether and the HBHC in a mixed solvent containing 70% by weight toluene, 15% by weight butanol and 15% ethanol and the resulting solutions employed to form cast films of the cellulose ethers. The preparation of the film casting solution is not recited in the following specific examples; rather, the composition and properties of the resulting film are given.

EXAMPLE I

A cast film containing 100 parts of ethyl cellulose having an ethoxyl content of about 46% and 20 parts of HBHC "A" is prepared as described above. This film is tough, flexible, extensible, strong and clear.

EXAMPLE II

A cast film containing 100 parts of ethyl cellulose having an ethoxyl content of about 48% and 20 parts of HBHC "B" is prepared as described above. This film is tough, flexible, extensible, strong and clear.

EXAMPLE III

A cellulose film is cast as described above. The resulting film contains 100 parts of ethyl cellulose having an ethoxyl content of about 49.5% and 20 parts of HBHC "A." The resulting film is clear, strong, tough, extensible and flexible.

EXAMPLE IV

Plasticized ethyl cellulose cast films are prepared as hereinbefore described. These films contain the quantities of HBHC and ethyl cellulose, ethoxyl content of about 49%, as tabulated below.

*Table I*

PLASTICIZED ETHYL CELLULOSE (49% ETHOXYL) CAST FILM

| Composition | Ethyl Cellulose, parts | HBHC | Properties of Film |
|---|---|---|---|
| A | 100 | 5 parts "A" | clear, strong, tough. |
| B | 100 | 10 parts "B" | Do. |
| C | 100 | 20 parts "B" | clear, strong, tough, extensible. |
| D | 100 | 23 parts "A" | Do. |
| E | 100 | 25 parts "A" | cloudy (incipient incompatibility). |
| F | 100 | 30 parts "A" | cloudy, oily film (incompatible). |
| G | 100 | 40 parts "B" | completely incompatible. |

EXAMPLE V

A plasticized butyl cellulose film is cast from a solution as hereinbefore described containing 100 parts of butyl cellulose having a butoxyl content of about 47% and 20 parts of HBHC "B." The resulting film is clear, tough, strong, extensible, and flexible.

EXAMPLE VI

A plasticized benzyl cellulose film is cast from a solution as hereinbefore described containing 100 parts of benzyl cellulose having a benzoxyl content of about 46% and 20 parts of HBHC "B." The resulting film is clear, strong, tough, flexible, and extensible.

EXAMPLE VII

Plasticized ethyl cellulose films are cast from a solution as hereinbefore described. These films contain the quantities of HBHC and ethyl cellulose, ethoxyl content of 48.5%, as tabulated below:

*Table II*

| HBHC | Parts | Ethyl Cellulose | Properties of Film |
|---|---|---|---|
| "C" | 10 | 100 | clear, strong, tough, flexible. |
| "C" | 20 | 100 | Do. |
| "E" | 10 | 100 | Do. |
| "E" | 20 | 100 | Do. |

Similar results are obtained when the HBHC "C" in each of the two compositions described in Table II is replaced by an equal amount of HBHC "D," "F," "G," "H," "I," "J," "K," "L," "M," "N," and "O."

It is apparent from the above data that cellulose ethers and HBHC are not compatible in all proportions. Generally, the use of more than about 25 parts by weight of HBHC per 100 parts by weight of a cellulose ether will not produce a clear cellulose ether film, for about 23 parts of HBHC "A" (see Example IV supra) per 100 parts of cellulose ether is the upper limit of compatibility of this liquid hydrocarbon material with cellulose ether. Useful plasticized cellulose ethers can be prepared with as little as 5 parts by weight of HBHC "A" per 100 parts of the cellulose ether. Thus, the useful range of use of HBHC "A" as a plasticizer for cellulose ethers is from about 5 to about 23 parts by weight of HBHC per 100 parts by weight of cellulose ether. The HBHC from the processes for the preparation of higher alkylbenzenes, i.e. $C_{13}$ and above, are more compatible; hence, more than 25 parts of HBHC per 100 parts of cellulose ether may be used. Therefore, it may be stated that plasticizing effects will be achieved by the use of from about 5 to about 25 parts by weight of HBHC per 100 parts by weight of cellulose ether.

The films prepared according to this invention can be employed as moisture barrier films for strip coatings for the protection of metal parts, machinery, etc., against corrosion and damage. These films can be used especially where the film will be exposed to extreme conditions of temperature, both outdoors and indoors, in warehouses, storage sheds, hulls of vessels, and the like, for the plasticizer will not bleed out, nor will it be removed from the cellulose ether film by water.

When desired mixtures of the cellulose ethers and HBHC compounds and other plasticizers for cellulose ethers can be used as, for example, such conventional plasticizers as diethyl phthalate, diphenyl phthalate, dibutyl sebacate, triethyl phosphate, trioctyl phosphate, triphenyl phosphate and methylphthalyl ethylglycolate. Likewise, colorants such as the dry colors, hydrocarbon soluble dyes, toners etc.; fillers such as sericite schist, wood flour, and finely divided powders of such metals as aluminum, copper, zinc and bronze; and stabilizers against the degradation of heat and/or light such as p-cyclohexylphenol, methylphenol, diisobutyl phenol and the like can be used with the cellulose ether compositions of this invention.

In addition to the cast films described in the above examples, the compositions of this invention can be employed in the preparation of molded and extruded articles. For example green tool handles can be molded from a composition containing 88 parts of ethyl cellulose (46% ethoxyl), 10 parts of HBHC "B," 2 parts of methyl Cellosolve stearate, 2 parts of diisobutyl phenol and 0.3 part of Argyle Green.

While in the instant invention the high boiling liquid aromatic hydrocarbon materials have been described with respect to certain embodiments, namely the highly boiling residue or fraction obtained from an alkylation product resulting from the condensation of benzene with a mono-chloride of a paraffin base kerosene fraction or preferably, from the alkylation product resulting from the condensation of benzene with a propylene polymer containing 9 to 18 carbon atoms, which respectfully provide a monophenyl branched chain alkane containing a carbon atom content in the range of 14 to 24 carbon atoms and characterized by a carbon atom chain length attached to a ring carbon atom of the aryl nucleus of 6 to 12 carbon atoms. It is to be understood that the invention is not so limited.

The high boiling liquid aromatic hydrocarbon materials produced when benzene is the starting material in the alkylation reaction are preferred; however, the high boiling fractions obtained when toluene and xylene are used in place of benzene are also embraced within the broader aspects of this invention.

Similarly, the high boiling fraction obtained from the alkylation product resulting from the reaction of benzene and a straight chain mono-olefinic hydrocarbon containing from 9 to 18 carbon atoms (or mixtures thereof containing an average of 9 to 18 carbon atoms) at low temperatures and in the presence of an alkylation catalyst are also within the broad aspects of this invention. For example, when 1-dodecene is reacted with benzene (slight excess) at 30–35° C. in the presence of aluminum chloride and HCl; and the excess benzene, intermediate fraction and dodecyl benzene fraction are removed by distillation, there remains a high boiling liquid aromatic hydrocarbon mixture which is compatible with the cellulose ethers described herein. Other straight chain mono-olefins such as decene, undecene, tridecene, tetradecene and octadecene, for example, may be employed in place of the 1-dodecene in the above described process.

Other conventional processes for obtaining the monoalkyl benzene and thusly, the high boiling residue, are described in the patent and technical literature relating to the production of sulfonated detergents and surface active agents, e.g. see U.S. Letters Patents 2,456,119 and 2,477,383.

In the specification and the appended claims, such terms as "tetramer" and "pentamer," for example, are used alternatively to the terms "$C_{12}$ polymer" and "$C_{15}$ polymer" respectively. It is to be understood that the propylene polymerization reaction does not proceed so smoothly or accurately as to yield only exact tetra or penta-multiples of the olefin feed but that such terms as used in this specification, are meant to be descriptive of those hydrocarbons present in the polymer product and boiling respectively within the $C_{12}$ and $C_{15}$ olefin boiling ranges, which ranges embrace the boiling points of various isomeric $C_{12}$ and $C_{15}$ polymer hydrocarbons present therein.

While this invention has been described with respect to certain embodiments, it is not so limited, and it is to be understood that variations and modifications thereof may be made without departing from the spirit or scope of this invention. This application is a continuation-in-part of application Serial No. 400,368, filed December 24, 1953, now abandoned.

What is claimed is:

1. A plasticized cellulose ether composition comprising a cellulose ether selected from the group consisting of lower alkyl cellulose ethers and aralkyl cellulose ethers having an alkoxyl content of at least about 40% and as a plasticizer therefor, a compatible amount of a high boiling liquid aromatic hydrocarbon mixture obtained as the high boiling residue from the alkylation product of an aromatic hydrocarbon of the benzene series with an alkylation agent selected from the group consisting of olefins and alkyl halides containing from 9 to 18 carbon atoms.

2. A plasticized cellulose ether composition comprising a cellulose ether selected from the group consisting of lower alkyl cellulose ethers and aralkyl cellulose ethers having an alkoxyl content of at least about 40% and as a plasticizer therefor, a compatible amount of a high boiling liquid aromatic hydrocarbon mixture obtained as the high boiling residue from the alkylation product of an aromatic hydrocarbon of the benzene series with an acyclic propylene polymer which contains from 9 to 18 carbon atoms.

3. A plasticized cellulose ether composition comprising a cellulose ether selected from the group consisting of lower alkyl cellulose ethers and aralkyl cellulose ethers having an alkoxyl content of at least about 40% and as a plasticizer therefor, from about 5 to about 25 parts by weight per 100 parts by weight of cellulose ether of a liquid aromatic hydrocarbon mixture obtained as the high boiling residue from the alkylation product of an aromatic hydrocarbon of the benzene series with an acyclic propylene polymer which contains from 12 to 18 carbon atoms.

4. A plasticized cellulose ether composition comprising a cellulose ether selected from the group consisting of lower alkyl cellulose ethers and aralkyl cellulose ethers having an alkoxyl content of 40% to 50%, and as a plasticizer therefor, from about 5 to about 25 parts by weight per 100 parts by weight of cellulose ether of a liquid aromatic hydrocarbon mixture obtained as the high boiling residue from the alkylation product of benzene with an acyclic propylene polymer which contains from 12 to 18 carbon atoms.

5. The composition of claim 4 wherein the liquid aromatic hydrocarbon mixture is the high boiling residue obtained from the alkylation product of benzene with a propylene tetramer.

6. The composition of claim 5 wherein the cellulose ether is ethyl cellulose.

7. The composition of claim 5 wherein the cellulose ether is butyl cellulose.

8. The composition of claim 5 wherein the cellulose ether is benzyl cellulose.

9. A plasticized cellulose ether composition comprising a cellulose ether selected from the group consisting of lower alkyl cellulose ethers and aralkyl cellulose ethers having an alkoxyl content of 40% to 50% and as a plasticizer therefor, from about 5 to about 25 parts by weight per 100 parts by weight of cellulose ether of a liquid aromatic hydrocarbon mixture obtained as the high boiling residue from the alkylation product of benzene with a mixture of branched chain olefins which contain an average of 13 carbon atoms.

10. The composition of claim 9 wherein the cellulose ether is ethyl cellulose.

11. The composition of claim 9 wherein the cellulose ether is butyl cellulose.

12. The composition of claim 9 wherein the cellulose ether is benzyl cellulose.

13. The composition of claim 4 wherein the liquid aromatic hydrocarbon mixture is the high boiling residue obtained from the alkylation product of benzene with a propylene pentamer.

References Cited in the file of this patent

UNITED STATES PATENTS 1,563,204   Lilienfeld _____ Nov. 24, 1925